G. W. JESSUP, Jr.
COMPOUND GAS ENGINE.
APPLICATION FILED SEPT. 21, 1910.
1,026,512.
Patented May 14, 1912.
4 SHEETS—SHEET 1.
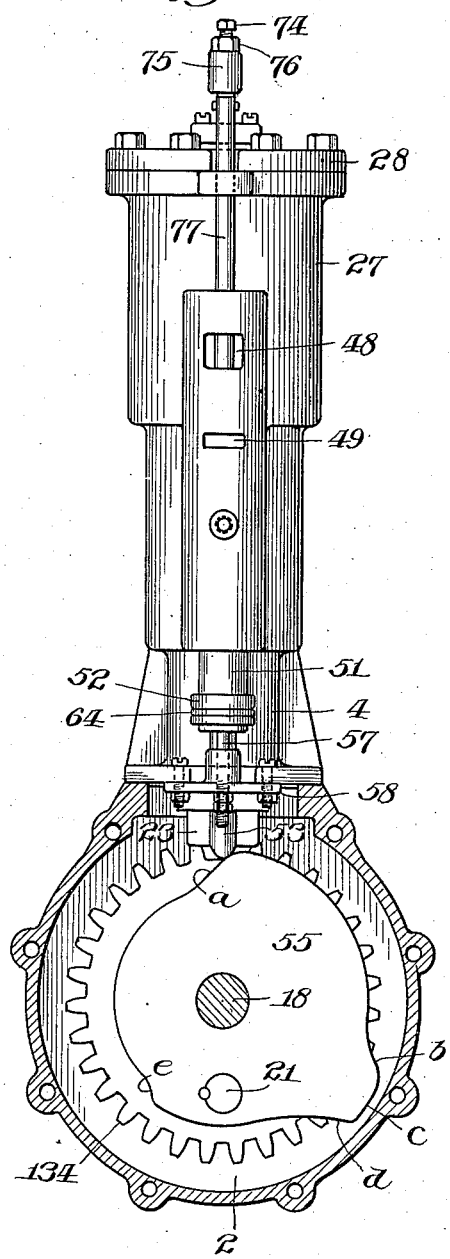
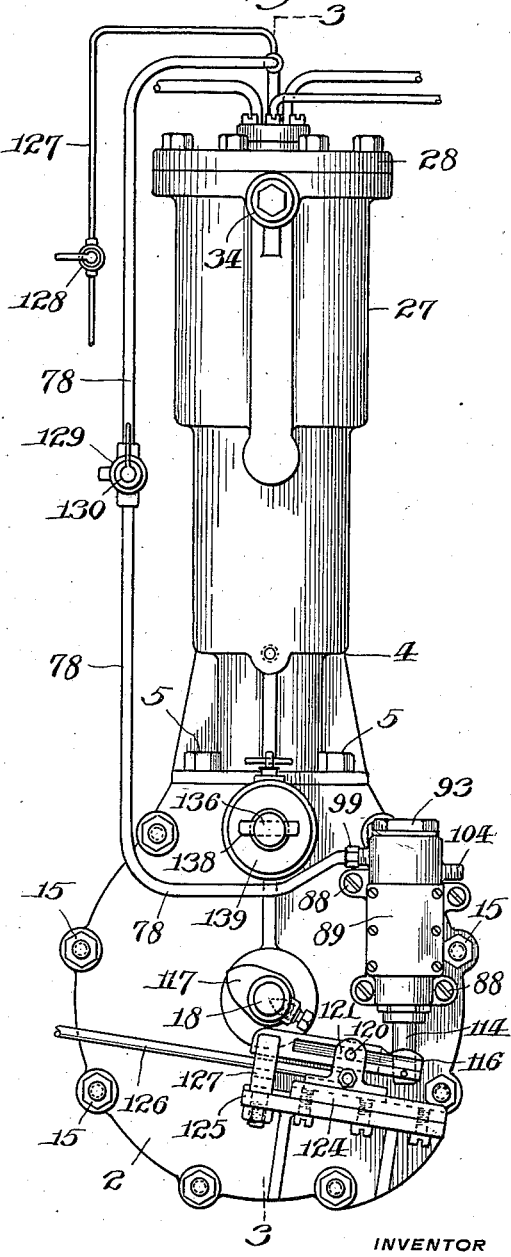

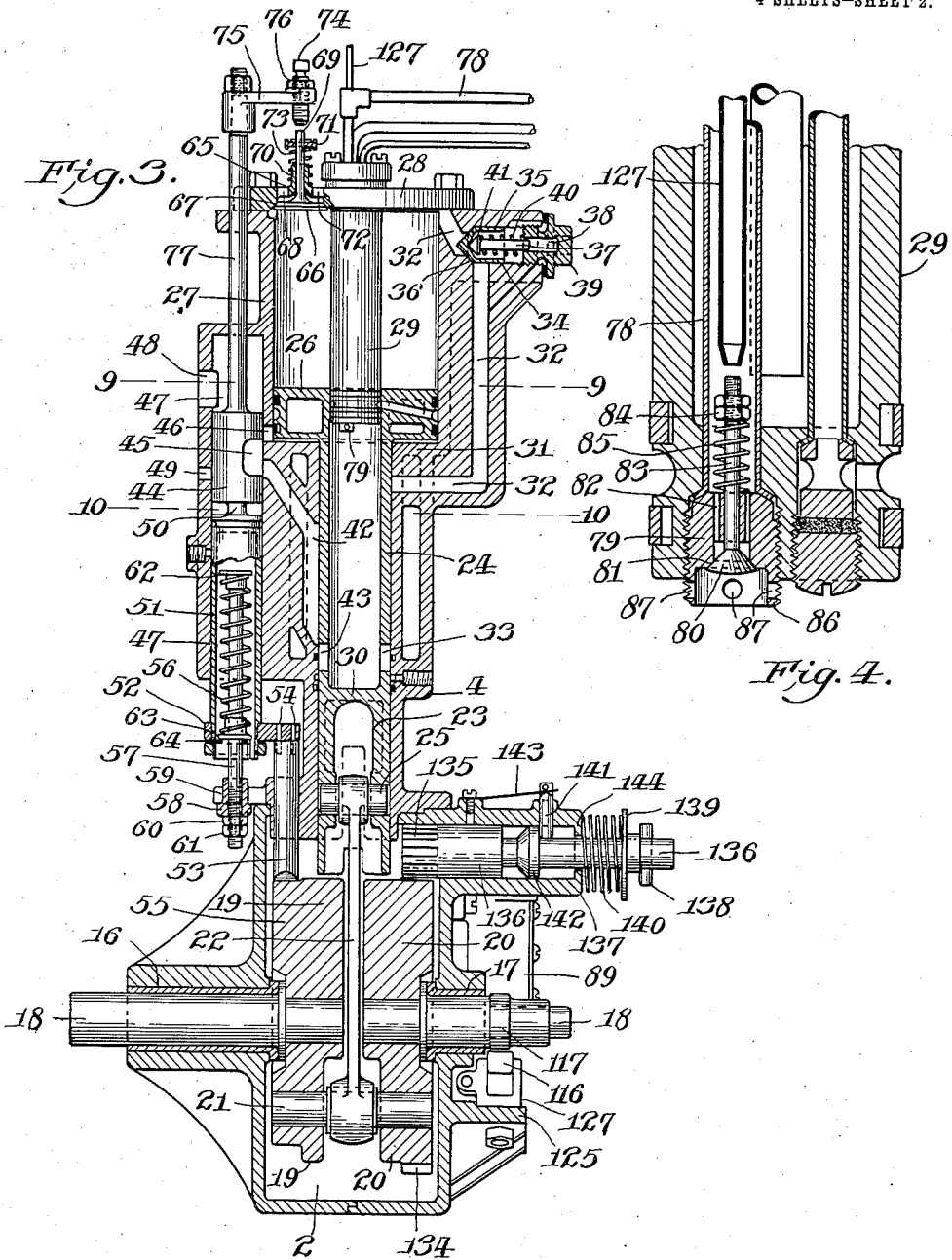

G. W. JESSUP, Jr.
COMPOUND GAS ENGINE.
APPLICATION FILED SEPT. 21, 1910.
1,026,512.
Patented May 14, 1912.
4 SHEETS—SHEET 3.
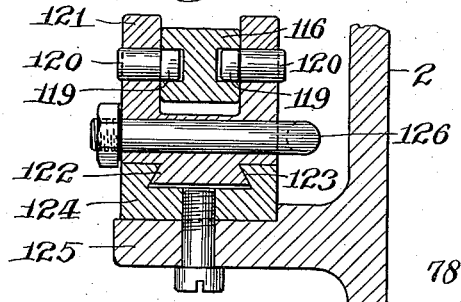
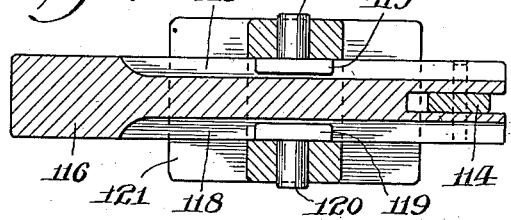
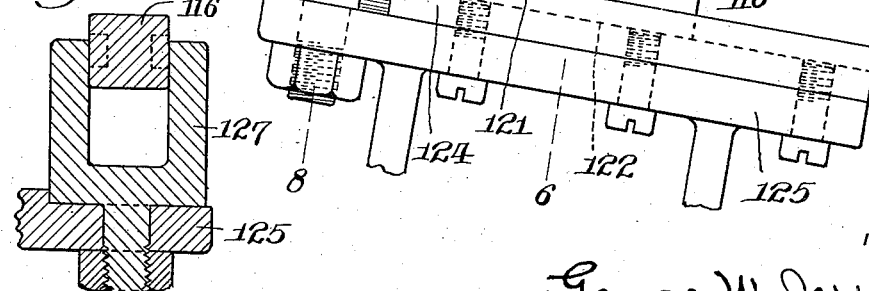
INVENTOR
George W. Jessup Jr.
BY
ATTORNEY
WITNESSES G. W. JESSUP, Jr.
COMPOUND GAS ENGINE.
APPLICATION FILED SEPT. 21, 1910.
1,026,512.
Patented May 14, 1912.
4 SHEETS—SHEET 4.
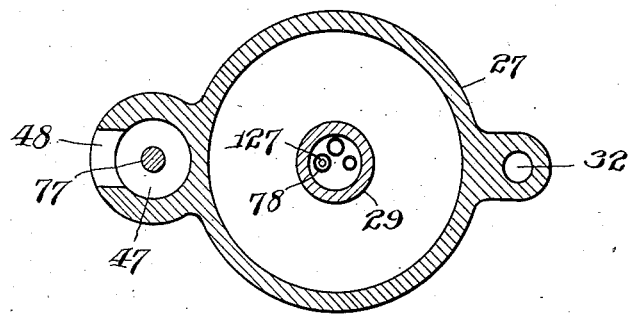
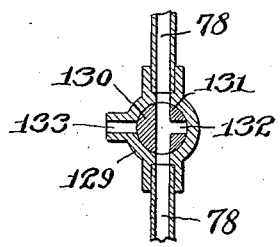
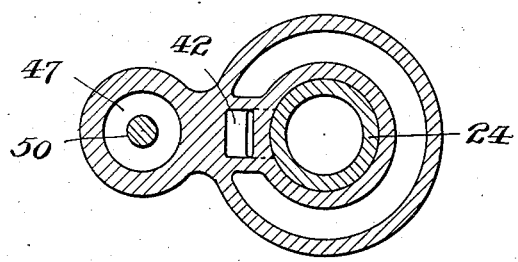
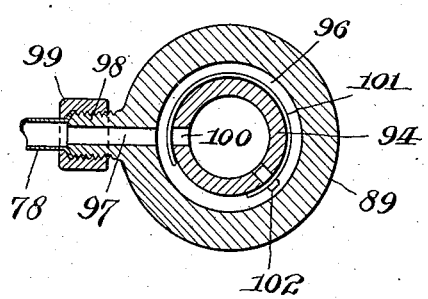
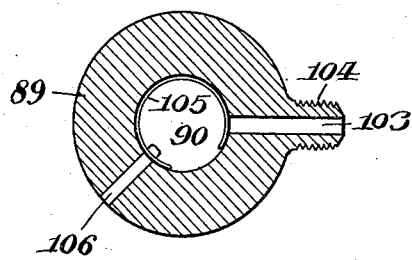
WITNESSES
W. E. Watson
F. E. Tenney
INVENTOR
George W. Jessup Jr.
BY
ATTORNEY

UNITED STATES PATENT OFFICE.

GEORGE W. JESSUP, JR., OF NEWTON, MASSACHUSETTS.

COMPOUND GAS-ENGINE.

1,026,512. Specification of Letters Patent. Patented May 14, 1912.

Application filed September 21, 1910. Serial No. 582,975.

*To all whom it may concern:*

Be it known that I, GEORGE W. JESSUP, Jr., a citizen of the United States, residing at Newton, Middlesex county, State of Massachusetts, have invented certain new and useful Improvements in Compound Gas-Engines, of which the following is a specification.

My invention relates to gas engines and particularly to compound gas engines.

The object of my invention is to provide a gas engine of novel, simple, and efficient construction, wherein the pistons and cylinders are arranged and connected together and to the power shaft as to nicely balance the engine during the operation thereof, and to give a large percentage of power for a given quantity of fuel.

A further object of the invention is to provide a novel means for supplying fuel to one of the cylinders and to regulate the amount of fuel supplied during the operation of the engine for controlling its power and speed; and a further object of my invention is to provide a novel means for manually starting the engine.

With the objects thus generally stated in view, the invention consists in the novel construction and combinations of parts hereinafter fully described and particularly claimed.

In the drawings:—Figure 1 is an elevation of one side of my improved engine. Fig. 2 is an elevation of the other side of the engine, showing a part of the frame in section. Fig. 3 is a vertical section of the engine, on line 3—3 of Fig. 1. Fig. 4 is a vertical section through the lower portion of the fixed piston, showing the fuel supply pipe and its discharge nozzle, and showing the pipe for the lubricating oil for the piston. Fig. 5 is a view showing the fuel-pump actuating mechanism and the fuel-pump in section. Fig. 6 is a section through the fulcrum of the pump actuating lever and adjuncts, on line 6—6 of Fig. 5. Fig. 7 is a horizontal section through the pump actuating lever and adjuncts, on line 7—7 of Fig. 5. Fig. 8 is a section through one end of the pump actuating lever and its guide bracket, on line 8—8 of Fig. 5. Fig. 9 is a horizontal section through the engine on line 9—9 of Fig. 3. Fig. 10 is a horizontal section through the engine, on line 10—10 of Fig. 3. Fig. 11 is a horizontal section through the fuel-pump, on line 11—11 of Fig. 5. Fig. 12 is a horizontal section through the fuel-pump, on line 12—12 of Fig. 5. Fig. 13 is a vertical section through the valve controlling the fuel pipe.

The main frame of the engine comprises a lower casing 2, and a standard 4, rising from and secured to the top of the casing 2 by cap screws 5. The casing 2 is made in two parts which are secured together by suitable bolts 15.

The casing 2 is provided with suitable bearings 16 and 17, in which is journaled the power shaft 18 of the engine. The power shaft 18 is made in two parts, as shown, and secured to the two parts of the shaft 18 within the casing 2, are crank arms 19 and 20, which are connected together by a crank pin 21. The crank arm 19 is secured to the inner end of one part of the shaft 18, and the crank arm 20 is secured to the inner end of the other part of the shaft 18, in a manner to afford a space between the crank arms 19 and 20 for the reception of a connecting rod 22 having its lower end surrounding the crank pin 21. It will thus be seen that the power shaft 18 may be rotated by raising and lowering the connecting rod 22, which, during the rotation of the shaft, will pass between the inner ends of the two parts thereof and between the two crank arms 19 and 20.

The upper end of the connecting rod 22 extends into a downward extension 23 formed on the lower end of a vertically-arranged cylinder 24, the upper end of the connecting rod 22 surrounding the central portion of a pin 25, the ends of which extend into the sides of the extension 23 of the cylinder 24. This cylinder 24 forms the high pressure cylinder for the engine, and it is slidably fitted to and guided by the standard 4 of the engine frame, in a manner to be vertically movable therein.

Formed on and surrounding the upper end of the high pressure cylinder 24, is a piston 26 fitted to the interior of the fixed cylinder 27, which is formed on the top of the standard 4 of the engine frame. This cylinder 27 is of greater diameter than the cylinder 24, and forms the compound, or low pressure cylinder for the engine. The upper end of the fixed cylinder 27 is closed by a suitable cap or cover plate 28, which is secured to the cylinder.

Extending downwardly from the cap or cover plate 28 through the center of the fixed cylinder 27 and into the movable cylinder 24 is a fixed piston 29, the upper end of which may be formed on, or otherwise secured to the top or cap 28 of the fixed cylinder 27. When the movable piston 26 is at the lower end of the fixed cylinder 27, the lower end of the fixed piston 29 extends a short distance into the upper end of the movable cylinder 24. It will therefore be seen that if the movable cylinder 24 and piston 26 be raised, the bottom 30 of the movable cylinder 24 will move toward the bottom of the fixed piston 29, and that the bottom of the movable piston 26 will move from the botton 31 of the fixed cylinder 27; and that if the movable cylinder 24 and piston 26 be lowered, the reverse operation will take place. It will therefore be understood that by raising and lowering the cylinder 24 and piston 26, the upper end of the connecting rod 22 will be raised and lowered in a manner to cause the connecting rod to rotate the power shaft 18; and it will also be understood that during the raising and lowering of the cylinder 24 and piston 26, the areas within the cylinders 24 and 27 beneath the pistons 29 and 26 respectively, will be increased and decreased, and that while the area within one cylinder beneath its piston is being increased, the area within the other cylinder beneath its piston is being decreased, and the converse.

The cylinder 27 not only forms the compound or low pressure cylinder for the engine beneath the piston 26 and bottom 31 of the cylinder, but the cylinder 27 also forms a compression chamber between its top 28 and the top of the piston 26, in which air is compressed and supplied to the high pressure cylinder at certain intervals during the operation of the engine, as will be hereinafter explained; and the means for supplying compressed air from the compression chamber to the high pressure cylinder 24 is as follows:—Formed in the standard 4 of the engine frame and the fixed cylinder 27 thereon is a passageway 32, which leads from the upper end of the cylinder 27 to a position adjacent the upper portion of the movable cylinder 24 when it is in its lowermost position, the lower end of the passageway 32 being closed by the cylinder 24 until it nears the limit of the upper end of its stroke, when the lower end of the passageway 32 is opened to the interior of the cylinder 24 through a port 33 in the side wall of the lower portion of the cylinder. The passageway 32 is interrupted by a valve 34 which is arranged to permit compressed air to pass from the upper portion of the cylinder 27 downwardly through the passageway 32 toward the cylinder 24 and to prevent the compressed air from passing in a reverse direction through the passageway 32. This valve 34 includes a piston or valve head 35 having a cylindrical body portion extending transversely of a vertical portion of the passageway 32 and fitted to slide in a suitable opening in the side wall of the cylinder 27. The inner end of the head 35 is beveled, as shown, and engaged with a valve seat 36 which surrounds the end of the horizontal portion of the passageway 32. Extending into and engaged with the valve head 35 is the inner end of a movable pin 37, the outer end of which extends into and is slidably fitted to an opening 38 in a cap 39 screwed into the cylinder 27. Encircling the pin 37 is a spring 40, the outer end of which is engaged with the head 39, and the inner end of which is engaged with a collar 41 on the pin 37, thereby tending to force the pin 37 and therewith the valve head 39 inwardly against the valve seat 36. The inner, beveled end of the valve head 35 is directed toward the interior of the cylinder 27. It will thus be seen that compressed air acting upon the beveled end of the valve head 35 will move the valve head against the action of the spring 40 to open the passageway 32 to permit compressed air to pass from the cylinder 27 downwardly through the passageway 32, and that when the pressure of the air within the passageway 32 on each side of the valve head 35 becomes equal, the spring 40 will return the valve head 35 to the valve seat 36, and thereby prevent the compressed air within the passageway 32 below the valve head 35 from returning to the cylinder 27 after the pressure therein is reduced below that of the main portion of the passageway 32.

During the operation of the engine, communication is established between the high pressure cylinder 24 and the low pressure cylinder 27 below its piston 26 at certain intervals, as will be hereinafter explained, and for this purpose, I provide the following:—Formed in the standard 4 of the engine frame is a passageway 42, the lower vertical portion of which extends some distance along the exterior wall of the movable high pressure cylinder 24 and is closed by said cylinder at certain intervals during the operation and is opened to the interior of the cylinder 24 at certain other intervals during the operation of the engine through a port 43 formed in the side wall of the cylinder 24 and adapted to be moved into and out of registry with the lower vertical portion of the passageway 42 during the vertical reciprocation of the cylinder 24. The upper, outer end of the passageway 42 is closed by a valve head 44 at certain intervals during the operation of the engine. This valve head 44 is slidably fitted to a vertical opening 47 in the standard 4 of the engine frame, and is provided on its inner side with a cut-away portion or opening 45 adapted to be moved into registry with the upper end of the passageway 42 and a port 46 in the lower portion of the cylinder 27 to connect the port 46 with the passageway 42 and afford communication between the cylinder 24 and the bottom of the cylinder 27 when the port 43 of the cylinder 24 is in registry with the vertical portion of the passageway 42, as will be hereinafter explained. The compound or low pressure cylinder 27 is exhausted through the port 46, opening 47 and port 48 in the wall of the opening 47 when the valve 44 is below the port 46 at certain intervals during the operation of the engine; and the high pressure cylinder 24 is exhausted through the port 43, passageway 42, opening 47 and port 49 in the wall of the opening 47 when the valve 44 is above the upper end of the passageway 42 at certain intervals during the operation of the engine, as will be hereinafter explained. The valve 44 is formed on the upper end of a short stem 50 extending upwardly from the upper closed end of a tube 51 which is slidably fitted to the opening 47. The lower portion of the tube 51 extends below the bottom of the opening 47 and secured to the lower end of the tube 51 is an inwardly extending arm 52 which rests upon a downwardly extending rod 53, the arm 52 being held in place upon the upper end of the rod 53 by pins 54 extending upwardly from the rod 53 and into openings in the arm 52. The rod 53 is fitted to a guide opening in the engine frame, and its lower end rests upon a cam 55 formed on the crank arm 19 hereinbefore referred to. The tube 51, arm 52 and rod 53 are pressed downwardly to maintain the rod 53 in engagement with the cam 55 by the action of a spring 56 located within the tube 51 and encircling a rod 57. The lower portion of the rod 57 extends through a head 58 which is engaged with a projection 59 on the engine frame, and the lower end of the rod 57 is screw-threaded and provided with a nut 60 engaged with the bottom of the head 58 and a jam nut 61 engaged with the bottom of the nut 60. The upper end of the rod 57 is provided with a fixed collar 62 against which the upper end of a spring 56 bears, and the lower portion of the rod 57 is provided with a movable collar 63 slidably fitted thereto and against which the lower end of the spring 56 bears. The bottom of the movable collar 63 is engaged with projections 64 extending into the bottom of the tube 51. It will thus be seen that the pressure of the spring 56 will hold the rod 53 down upon the cam 55, and that the tube 51 and therewith the valve 44 will be raised and lowered with the rod 53 under the influence of the cam 55 during the rotation of the power shaft 18. The cam 55 not only controls the valve 44, but it also controls an air inlet valve 65 for the compression chamber formed in the cylinder 27 above the piston 26. This valve 65 includes a head 66 adapted to a valve seat 67 surrounding the lower portion of the valve opening 68 formed in the cap or cover plate 28 for the cylinder 27. The head 66 is formed on the lower end of a stem 69 which extends upwardly through a guide tube 70 which projects upwardly from arms 72 radiating from the bottom thereof and to the sides of the opening 68. The top of the stem 69 is provided with a fixed collar 71; and extending between the collar 71 and arm 72 and surrounding the tube 70, is a spring 73, which tends normally to force the valve head 66 toward its seat 67 to close the valve. Arranged directly above the top of the valve stem 69 is the lower end of a screw 74 which is screwed into and through an arm 75, a jam nut 76 being provided to hold the screw 74 in positions of adjustment. The arm 75 projects from the upper end of a rod 77 which is secured to and extends upwardly from the valve 44. During the operation of the engine, the screw 74 is adapted to be raised and lowered with the valve 44 under the influence of the cam 55. When the screw 74 is lowered it engages the top of the valve stem 69 and moves the head 66 from the seat 67 against the action of the spring 73 to open the valve. When the screw 74 is raised, the spring 73 is permitted to return the valve 66 to its seat 67 to close the same.

Leading to the top of the cap or cover plate 28 of the cylinder 27 is a gasolene or other fuel supply pipe 78 which extends down through the cover plate 28 and through the fixed piston 29, and has its lower end in communication with a nozzle 79 screwed into the bottom of the piston 29 and opening into the cylinder 24. This nozzle 79 is controlled by a valve head 80 which is fitted to a valve seat 81 surrounding the lower end of a valve opening or passageway 82 formed in the head or nozzle 79. The valve head 80 is provided with a stem 83 which extends upwardly therefrom through and beyond the head or nozzle 79 and into the lower end of the pipe 78. The upper portion of this stem 83 is provided with an adjustable collar 84, and surrounding the stem 83 between the bottom of the collar 84 and the top of the head or nozzle 79 is a spring 85 which maintains the valve normally closed. From this construction it will be seen that if gasolene or other similar fuel be forced through the pipe 78, the pressure of the gasolene or other fuel will open the valve 80 against the action of the spring 85 to permit the gasolene or other fuel to be discharged from the bottom of the opening 82 and into the cylinder 24. In order to break up the gasolene or other fuel discharged from the opening 82 into a spray, I provide the bottom of the head or nozzle 79 with a downwardly-extending flange 86, the interior diameter of which is greater than the diameter of the opening 82; and I provide the flange 86 with radially-arranged openings 87. It will thus be seen that when the valve head 80 is lowered from its seat 81, the gasolene or other fuel will strike the upper beveled face of the head 80, and will thereby be directed against the flange 86, thus breaking the gasolene into a fine spray.

During the operation of the engine, as will be hereinafter explained, gasolene or other fuel is discharged from the nozzle 79 into the high pressure cylinder 24 at predetermined intervals, and for this purpose I provide a pump operated by the mechanism of the engine as follows:—Secured to one side of the casing 2 of the engine frame by screws 88 is a casing 89 providing an upper chamber 90 and a lower chamber 91 separated from the upper chamber 90 by a partition wall 92. The top of the chamber 90 is closed by a plug 93 screwed into the casing 89. The bottom of the plug 93 is provided with a downwardly-extending flange 94, the bottom of which is engaged with a shoulder 95 of the casing 89. The exterior diameter of the flange 94 is less than the diameter of that portion of the plug 93 which is screwed into the casing 89, thus providing an annular space 96 separate from the chamber 90. Leading from the annular space 96 is an opening or passageway 97 which extends through a projection 98 on the casing 89. The projection 98 is screw-threaded for the reception of a coupling nut 99 by means of which the gasolene or other fuel pipe 78, hereinbefore referred to, is attached to the projection 98, the pipe 78 being in communication with the passageway 97 and leading therefrom to the nozzle 79 hereinbefore referred to. The flange 94 is provided with a port 100 to afford communication between the chamber 90 and the annular space 96, and the outer end of its port 100 is maintained normally closed by a curved leaf spring 101 which extends part way around the flange 94 and has one end secured thereto by means of a pin 102, while the other end bears against the outer face of the flange 94 around the outer end of the port 100. Thus the spring 101 will permit gasolene to flow under pressure from the chamber 90 to the annular space 96 and thence to the pipe 78 through the port 100 and prevent the gasolene from flowing in a reverse direction. Leading to the chamber 90 below the flange 94 is a port or passageway 103 which extends through a projection 104 on the casing 89, the projection 104 being screw-threaded for attaching a pipe thereto leading from any suitable source of gasolene or other fuel supply. The inner end of the port 103 is covered by the free end of a leaf spring 105 which extends around the interior of the chamber 90, and has its other end held in place by a pin 106 extending through the casing 89. The free end of the leaf spring 105 presses normally against the wall of the chamber 90 around the inner end of the port 103 to maintain the port closed and to permit gasolene or other fuel to be drawn into the chamber 90 against the action of the leaf spring 105 and to prevent gasolene from being forced from the chamber 90 back through the port 103. The partition 92 is provided with a boss 107 which extends downwardly into the chamber 91, and screwed into this boss 107 is a head 108 provided with a central, vertical opening therein to which is fitted a vertically-arranged plunger 109. From the construction thus far described, it will be seen that if the plunger 109 be raised or moved into the chamber 90, a portion of the gasolene or other fuel filling the chamber 90 will be discharged therefrom through the discharge port 100 against the action of the leaf spring 101; it will also be seen that if the plunger 109 be moved downwardly from its position within the chamber 90, gasolene or other fuel will be drawn into the chamber 90 through the supply port 103 against the action of the leaf spring 105. It therefore follows that each time the plunger 109 is raised and lowered, a quantity of gasolene or other fuel will be drawn into the chamber 90 and a quantity of gasolene or other fuel will be discharged from the chamber 90 into and through the pipe 78 and through the nozzle 79 into the high pressure cylinder 24. The bottom of the plunger 109 is provided with a head 110 and surrounding the plunger 109 above the head 110 is a collar 111, which rests upon the head 110. Surrounding the plunger 109 and boss 107 within the chamber 91, is a spring 112, the upper end of which bears against the partition 92, and the lower end of which bears against the collar 111 and forces it and therewith the head 110 of the plunger 109 down against the top of a head 113, formed on the top of a rod 114. This rod 114 is slidably fitted to a vertical opening in a plug 115, which is screwed into the bottom of the casing 89, and the head 113 of the rod 114 is pressed normally against the top of the plug 115 by the action of the spring 112. It will thus be seen that when the rod 114 is raised and lowered, the plunger 109 will also be raised and lowered. The bottom of the rod 114 is pivoted to one end of a lever 116, the other end of which extends into the path of a cam 117 secured to the power shaft 18 of the engine. The sides of the lever 116 have longitudinally-arranged grooves 118 formed therein, and slidably fitted to the grooves 118 are blocks 119 provided with outwardly-extending fulcrum pins 120 for the lever 116. These fulcrum pins 120 extend into openings in a bracket 121, the bottom of which is provided with a dove-tail projection 122 extending parallel to the lever 116 and fitted to a dove-tail guideway 123 formed in a plate 124, which is secured to a projection 125 on the side of the casing 2. The bracket 121 is connected to one end of a throttle rod 126, by means of which the bracket 121 may be moved longtiudinally of its guideway 123 to move the fulcrum pins 120 and their blocks 119 longitudinally of the lever 116 and toward and from the rod 114, for a purpose presently appearing. The end of the lever 116 beneath the cam 117 extends into and is guided by a bifurcated block 127 secured to the bracket 125 to maintain the lever 116 in proper position in the path of the cam 117. During each revolution of the power shaft 18 of the engine in the direction indicated by the arrow, the cam 117 engages the adjacent end of the lever 116 and moves it downwardly on its fulcrum pins 120, thereby causing the lever 116 to raise the rod 114 and therewith the plunger 109 against the action of the spring 112, and when the cam 117 escapes the lever 116, the spring 112 moves the plunger 109 and rod 114 downwardly, and returns the lever 116 to the position shown. It will thus be seen that during each revolution of the power shaft 18, the gasolene or fuel pump will be operated to discharge a quantity of fuel from the nozzle 79 and into the high pressure cylinder 24. The amount of fuel discharged from the nozzle 79 at each revolution of the power shaft 18, is of course controlled by the extent of movement of the plunger 109; and the extent of movement of the plunger 109 by the lever 116 under the influence of the cam 117 is controlled by the position of the fulcrum pins 120 with relation to the rod 114 and cam 117. It therefore follows that the quantity of fuel discharged from the nozzle 79 at each revolution of the power shaft 18, may be nicely regulated by operating the throttle rod 126 to move the bracket 121 and shift the fulcrum pins 120 toward and from the rod 114.

In order to introduce a suitable priming fuel oil to that portion of the pipe 78 within the fixed piston 29 before starting the engine, I provide a pipe 127 which extends down through that portion of the pipe 78 which extends through the fixed piston 29, the lower open end of the pipe 127 being located directly above the nozzle 79. This pipe 127 is controlled by a suitable valve 128. When the priming oil is thus introduced, it is necessary to employ a valve 129, as will be hereinafter explained, which interrupts the pipe 78. This valve 129 is provided with a plug 130, having a passageway 131 therein, which is adapted to be moved into registry with the upper and lower portions of the pipe 78 to afford communication between the same, and the plug 130 is provided with a passageway 132 extending from the passageway 131 at right angles thereto. The plug 130 is adapted to be turned to close the lower portion of the pipe 78, and to bring the passageways 131 and 132 into registry with a port 133 in the valve 129 and the upper portion of the pipe 78 respectively, to afford communication between the upper portion of the pipe 78 and the open air through the port 133.

In order to manually turn the power shaft 18 for the purpose of starting the engine, I provide the following:—Formed on or secured to the crank arm 20 on the power shaft 18, is a gear wheel 134, which coacts with a pinion 135 formed on the large inner end of a shaft 136, which is mounted to rotate in a bearing 137 in the engine frame and the outer end of which is reduced, as shown. The upper end of the shaft 136 is provided with a transverse pin 138, and is adapted to receive the hub of a suitable crank, the projecting ends of the pin 138 entering slots in the hub of the crank, whereby when the crank is turned, the shaft 136 will be turned to cause the pinion 135 to rotate the gear wheel 134 and therewith the power shaft 18. The reduced end of the shaft 136 is provided with a loose collar 139 adjacent the inner side of the pin 138 and surrounding the shaft 136 between the collar 139 and plate 144 secured to the outer end of the bearing 137, is a spring 140, which presses the collar 139 against the pin 138, and tends to force the shaft 136 outwardly. When the parts are in the position shown, the outward movement of the shaft 136 under the influence of the spring 140 is limited by a pin 141 engaging the outer face of a collar 142 which surrounds the reduced portion of the shaft 136 and is provided with an inner beveled face, as shown. The pin 141 is slidably fitted to an opening in the top of the bearing 137 and is movable toward and from the shaft 136, and is pressed normally into engagement with the shaft 136 by the action of a flat spring 143, having one end secured to the bearing 137 and the other end bearing upon the pin 141. When the parts occupy the position shown, the pin 135 is in engagement with the gear wheel 134, and the shaft 136 is in its inner position, being retained therein against the action of the spring 140 by the pin 141 engaging the outer face of the collar 142. After the engine has been started by manually turning the shaft 136, the pin 141 is raised by hand against the action of the spring 143 until it escapes the outer face of the collar 142, thereby permitting the spring 140 to move the shaft 136 outwardly until the pinion 135 is disengaged from the gear wheel 134, and the collar 142 engages the plate 144. The pin 141 and spring 143 are then released, and the spring 143 moves the pin 141 into engagement with the shaft 146 inwardly of the collar 142. This is the normal position of the starting shaft 136 with its pinion 135 out of engagement with the gear wheel 134. When it is desired to engage the pinion 135 with the gear wheel 134 to start the engine, it is merely necessary to move the shaft 136 inwardly against the action of the spring 140 until the inner beveled face of the collar 142 has pressed the pin 141 and its spring 143 outwardly, and the pin 141 is returned to the shaft 136 by the spring 143, adjacent the outer face of the collar 142.

Assuming that the engine is running, its operation briefly described, is as follows:—The movable cylinder 24 and piston 26 are forced up and down, and the connecting rod 22 is thus caused to rotate the power shaft 18 and the parts carried thereby, in the direction indicated by the arrow. When the parts occupy the positions shown in the drawings, the movable high pressure cylinder 24 and the movable piston 26 are at the lower end of their stroke, the same having been forced down by an exploded charge of fuel between the bottom of the fixed piston 29 and bottom 30 of the cylinder 24. Immediately after the crank arms 19 and 20 pass the center at the lower end of the stroke and the cylinder 24 and piston 26 start upward, the surface $a$ of the cam 55 acts upon the rod 53 to raise the screw 74 to permit the valve 66 to close and to raise the valve 44 to bring the opening 45 therein into registry with the passageway 42 and port 44, thereby establishing communication between the low pressure cylinder 27 below its piston 26 and the high pressure cylinder 24 through the port 43, which comes into registry with the vertical portion of the passageway 42, as the opening 45 in the valve 44 is moved into registry with the passageway 42 and port 46. The gases now pass from the high pressure cylinder 24 to the low pressure cylinder 27 beneath its piston 26, and force the piston 26 upwardly. The gases continue to pass from the high pressure cylinder 24 to the low pressure cylinder 27 until the power shaft 18 is turned about one-quarter revolution when the surface $b$ of the cam 55 acts upon the rod 53 to raise the valve 44 above the upper end of the passageway 42, thereby cutting off communication between the high pressure cylinder 24 and low pressure cylinder 27 and establishing communication between the exhaust port 49 and passageway 42 to permit the burnt gases to exhaust from the high pressure cylinder 24. When the valve 44 is raised to exhaust the gases from the high pressure cylinder 24, it is held by the surface $c$ of the cam 55 in position to maintain the port 46 of the low pressure cylinder 27 closed, so that the gases within the cylinder 27 below the piston 26 will continue to force it upwardly while the gases are being exhausted from the high pressure cylinder. Just as the cylinder 24 and piston 26 reach the end of their upward stroke, the surface $d$ of the cam 55 permits the spring 56 to lower the valve 44 to a position in which the port 46 is opened to the exhaust port 48 to permit the gases to escape from the low pressure cylinder 27. As the piston 26 is forced upwardly, it compresses the air within the cylinder 27 above the piston, and forces the compressed air into the passageway 32; and as the cylinder 24 and piston 26 reach the end of their upward stroke, the port 43 moves above or out of registry with the vertical portion of the passageway 32, and the port 33 comes into registry with the passageway 32, thereby permitting the compressed air to enter the high pressure cylinder 24 from the passageway 32 and cylinder 27. As the crank arms 19 and 20 pass the center at the upper end of the stroke of the cylinder 24 and piston 26, and for a short time thereafter, the cam 117 acts upon the lever 118 to raise the pump plunger 109 and thereby discharge a spray of gasolene or other fuel into the compressed air within the cylinder 24, the compressed air causing the fuel to ignite and drive the high pressure cylinder 24 and piston 26 downward for a succeeding operation. During the initial downward movement, the compressed air within the clearance space between the top of the piston 26 and cylinder 27 assists in forcing the cylinder 24 and piston 26 downwardly until the surface $e$ of the cam 55 permits the spring 56 to lower the screw 74 to open the valve 66, after which the continued downward movement of the piston 26 draws a charge of fresh air into the cylinder 27 above the piston and exhausts the burnt gases from the cylinder 27 below the piston 26.

During the operation of the engine, the throttle rod 126 may be moved, as desired, to adjust the fulcrum pins 120 of the lever 118 for controlling the amount of fuel discharged from the nozzle 79, as previously explained, and thereby control the speed and power of the engine.

When the engine is first started, the plug 130 of the valve 129 is turned to close the lower portion of the fuel pipe 78 and to open the upper portion thereof to the open air through the port 133, and the valve 128 is opened to permit a quantity of fuel oil, lighter than the oil usually employed in running the engine, to flow into the pipe 78 adjacent the nozzle 79, it being difficult to start the engine with the oil usually employed in running the same, whereupon the valve 128 is closed, and the plug 130 of the valve 129 is turned to establish communication between the upper and lower portions of the pipe 78. This being done, a crank is applied to the outer end of the starting shaft 136 and the shaft turned until an explosion occurs within the high pressure cylinder 124, which starts the operation of the engine, as previously described.

I claim:—

1. In a compound gas engine, the combination of a fixed cylinder; a movable piston therein; a movable cylinder; a fixed piston within the movable cylinder, one cylinder receiving the high pressure and one cylinder receiving the low pressure during the operation of the engine; a power shaft; means for transmitting power from said movable piston and said movable cylinder to said power shaft; means for establishing communication between said cylinders at predetermined intervals; and means for causing explosions within the high pressure cylinder at predetermined intervals.

2. In a compound gas engine, the combination of a frame; a fixed low pressure cylinder; a movable piston therein; a movable high pressure cylinder carried by said piston; a fixed piston within said movable cylinder; a power shaft journaled in the frame; power transmitting connections between said movable cylinder and movable piston and said shaft; means for establishing communication between said cylinders at predetermined intervals; and means for causing explosions within the high pressure cylinder at predetermined intervals.

3. In a compound gas engine, the combination of a frame; a fixed low pressure cylinder; a movable piston therein; a movable high pressure cylinder carried by said piston; a fixed piston within said movable cylinder; a power shaft journaled in the frame; power transmitting connections between said movable cylinder and movable piston and said shaft; means for establishing communication between said high pressure cylinder and said low pressure cylinder between one of its ends and one face of its piston at predetermined intervals, said low pressure cylinder forming a compression chamber between its other end and the other face of its piston and said compression chamber having an inlet passageway and an outlet passageway leading to a position adjacent the high pressure cylinder; a valve controlling said inlet passageway; and means for establishing communication between said outlet passageway and said high pressure cylinder at predetermined intervals.

4. In a compound gas engine, the combination of a frame; a fixed low pressure cylinder; a movable piston therein; a movable high pressure cylinder carried by said piston; a fixed piston within said movable cylinder; a power shaft journaled in the frame; power transmitting connections between said movable cylinder and movable piston and said shaft; means for establishing communication between said high pressure cylinder and said low pressure cylinder between one of its ends and one face of its piston at predetermined intervals, said low pressure cylinder forming a compression chamber between its other end and the other face of its piston and said compression chamber having an inlet passageway and an outlet passageway leading to a position adjacent the high pressure cylinder; a valve controlling said inlet passageway; means for establishing communication between said outlet passageway and said high pressure cylinder at predetermined intervals; and a valve permitting air to pass through said outlet passageway toward the high pressure cylinder and preventing air from passing in a reverse direction.

5. In a compound gas engine, the combination of a frame; a fixed low pressure cylinder; a movable piston therein; a movable high pressure cylinder carried by said piston and extending downwardly therefrom; a fixed piston extending downwardly through the low pressure cylinder and into the upper portion of the high pressure cylinder; a power shaft journaled in the frame; power transmitting connections between the lower end of the high pressure cylinder and said shaft; means for establishing communication between said cylinders at predetermined intervals; and means for causing explosions within the high pressure cylinder at predetermined intervals.

6. In a compound gas engine, the combination of a frame; a fixed low pressure cylinder; a movable piston therein; a movable high pressure cylinder carried by said piston and extending downwardly therefrom; a fixed piston extending downwardly through the low pressure cylinder and into the upper portion of the high pressure cylinder; a power shaft journaled in the frame; power transmitting connections between the lower end of the high pressure cylinder and said shaft; means for establishing communication between said high pressure cylinder and said low pressure cylinder below its piston at predetermined intervals, said low pressure cylinder forming a compression chamber above its piston and having an inlet passageway above its piston and an outlet passageway above its piston and leading to a position adjacent the high pressure cylinder; a valve controlling said inlet passageway; and means for establishing communication between said outlet passageway and said high pressure cylinder at predetermined intervals.

7. In a compound gas engine, the combination of a frame; a fixed low pressure cylinder; a movable piston therein; a movable high pressure cylinder carried by said piston and extending downwardly therefrom; a fixed piston extending downwardly through the low pressure cylinder and into the upper portion of the high pressure cylinder; a power shaft journaled in the frame; power transmitting connections between the lower end of the high pressure cylinder and said shaft; means for establishing communication between said high pressure cylinder and said low pressure cylinder below its piston at predetermined intervals, said low pressure cylinder forming a compression chamber above its piston and having an inlet passageway above its piston and an outlet passageway above its piston and leading to a position adjacent the high pressure cylinder; a valve controlling said inlet passageway; means for establishing communication between said outlet passageway and said high pressure cylinder at predetermined intervals; and a valve permitting air to pass through said outlet passageway toward the high pressure cylinder and preventing air from passing in a reverse direction.

8. In a compound gas engine, the combination of a frame; a fixed low pressure cylinder; a movable piston therein; a movable high pressure cylinder carried by said piston and extending downwardly therefrom; a fixed piston extending downwardly through the low pressure cylinder and into the upper portion of the high pressure cylinder; a power shaft journaled in the frame; power transmitting connections between the lower end of the high pressure cylinder and said shaft; means for establishing communication between said high pressure cylinder and said low pressure cylinder below its piston at predetermined intervals, said low pressure cylinder forming a compression chamber above its piston and having an inlet passageway above its piston and an outlet passageway above its piston and leading to a position adjacent the high pressure cylinder; a valve controlling said inlet passageway; and a valve permitting air to pass through said outlet passageway toward the high pressure cylinder and preventing air from passing in the reverse direction; said high pressure cylinder having a port therein adapted to register with said outlet passageway at predetermined intervals to afford communication between said outlet passageway and the high pressure cylinder.

9. In a compound gas engine, the combination of a frame; a fixed low pressure cylinder; a movable piston therein; a movable high pressure cylinder carried by said piston, a fixed piston within said movable cylinder; a power shaft journaled in the frame; power transmitting connections between said movable cylinder and movable piston and said shaft; means for causing explosions within the high pressure cylinder at predetermined intervals; a fixed wall forming a passageway leading from a position adjacent the movable cylinder; said movable cylinder having a port therein adapted to register with said passageway at predetermined intervals; a valve provided with means for establishing communication between said fixed cylinder and said passageway at predetermined intervals; and means for actuating said valve.

10. In a compound gas engine, the combination of a frame; a fixed low pressure cylinder; a movable piston therein; a movable high pressure cylinder carried by said piston; a fixed piston within said movable cylinder; a power shaft journaled in the frame; power transmitting connections between said movable cylinder and movable piston and said shaft; a fixed wall forming a passageway leading from a position adjacent the movable cylinder; said movable cylinder having a port therein adapted to register with said passageway at predetermined intervals; a valve provided with means for establishing communication between said passageway and said fixed cylinder between one end of the fixed cylinder and one face of its piston; means for actuating said valve; said fixed cylinder forming a compression chamber between its other end and the other face of its piston and said compression chamber having an inlet passageway and an outlet passageway leading to a position adjacent the movable cylinder; a valve controlling said inlet passageway; and means for establishing communication between said outlet passageway and said movable cylinder at predetermined intervals.

11. In a compound gas engine, the combination of a frame; a fixed low pressure cylinder; a movable piston therein; a movable high pressure cylinder carried by said piston; a fixed piston within said movable cylinder; a power shaft journaled in the frame; power transmitting connections between said movable cylinder and movable piston and said shaft; a fixed wall forming a passageway leading from a position adjacent the movable cylinder; said movable cylinder having a port therein adapted to register with said passageway at predetermined intervals; a valve provided with means for establishing communication between said passageway and said fixed cylinder between one end of the fixed cylinder and one face of its piston; means for actuating said valve; said fixed cylinder forming a compression chamber between its other end and the other face of its piston and said compression chamber having an inlet passageway and an outlet passageway leading to a position adjacent the movable cylinder; a valve controlling said inlet passageway; means for establishing communication between said outlet passageway and said movable cylinder at predetermined intervals; and a valve permitting air to pass through said passageway toward the movable cylinder and preventing air from passing in the reverse direction.

12. In a compound gas engine, the combination of a frame; a fixed low pressure cylinder; a movable piston therein; a movable high pressure cylinder carried by said piston and extending downwardly therefrom; a fixed piston extending downwardly through the low pressure cylinder and into the upper portion of the high pressure cylinder; a power shaft journaled in the frame; power transmitting connections between the lower end of the high pressure cylinder and said shaft; means for causing explosions within the high pressure cylinder at predetermined intervals; a fixed wall forming a passageway leading from a position adjacent the movable cylinder; said movable cylinder having a port therein adapted to register with said passageway at predetermined intervals; a valve provided with means for establishing communication between said fixed cylinder and said passageway at predetermined intervals; and means for actuating said valve.

13. In a compound gas engine, the combination of a frame; a fixed low pressure cylinder; a movable piston therein; a movable high pressure cylinder carried by said piston and extending downwardly therefrom; a fixed piston extending downwardly through the low pressure cylinder and into the upper portion of the high pressure cylinder; a power shaft journaled in the frame; power transmitting connections between the lower end of the high pressure cylinder and said shaft; a fixed wall forming a passageway leading from a position adjacent the movable cylinder; said movable cylinder having a port therein adapted to register with said passageway at predetermined intervals; a valve provided with means for establishing communication between said passageway and said fixed cylinder below its piston at predetermined intervals; means for actuating said valve; said fixed cylinder forming a compression chamber above its piston and having an inlet passageway above its piston and an outlet passageway above its piston and leading to a position adjacent the movable cylinder; a valve controlling said inlet passageway; and means for establishing communication between said outlet passageway and said movable cylinder at predetermined intervals.

14. In a compound gas engine, the combination of a frame; a fixed low pressure cylinder; a movable piston therein; a movable high pressure cylinder carried by said piston and extending downwardly therefrom; a fixed piston extending downwardly through the low pressure cylinder and into the upper portion of the high pressure cylinder; a power shaft journaled in the frame; power transmitting connections between the lower end of the high pressure cylinder and said shaft; a fixed wall forming a passageway leading from a position adjacent the movable cylinder; said movable cylinder having a port therein adapted to register with said passageway at predetermined intervals; a valve provided with means for establishing communication between said passageway and said fixed cylinder below its piston at predetermined intervals; means for actuating said valve; said fixed cylinder forming a compression chamber above its piston and having an inlet passageway above its piston and an outlet passageway above its piston and leading to a position adjacent the movable cylinder; a valve controlling said inlet passageway; means for establishing communication between said outlet passageway and said movable cylinder at predetermined intervals; and a valve permitting air to pass through said passageway toward the movable cylinder and preventing air from passing in the reverse direction.

15. In a compound gas engine, the combination of a frame; a fixed low pressure cylinder; a movable piston therein; a movable high pressure cylinder carried by said piston and extending downwardly therefrom; a fixed piston extending downwardly through the low pressure cylinder and into the upper portion of the high pressure cylinder; a power shaft journaled in the frame; power transmitting connections between the lower end of the high pressure cylinder and said shaft; a fixed wall forming a passageway leading from a position adjacent the movable cylinder; said movable cylinder having a port therein adapted to register with said passageway at predetermined intervals; a valve provided with means for establishing communication between said passageway and said fixed cylinder below its piston at predetermined intervals; means for actuating said valve; said fixed cylinder forming a compression chamber above its piston and having an inlet passageway above its piston and an outlet passageway above its piston and leading to a position adjacent the movable cylinder; a valve controlling said inlet passageway; and a valve permitting air to pass through said passageway toward the movable cylinder and preventing air from passing in the reverse direction; said movable cylinder having a port therein adapted to register with said outlet passageway at predetermined intervals.

16. In a gas engine the combination with a cylinder; a piston therein; means for supplying air to said cylinder; a power shaft; and means for transmitting power from said piston to said shaft; of a fuel pipe having a nozzle opening into said cylinder; a fuel pump having an operating part; a lever connected to said part; and means operated by the engine mechanism for operating said lever.

17. In a gas engine the combination with a cylinder; a piston therein; means for supplying air to said cylinder; a power shaft; and means for transmitting power from said piston to said shaft; of a fuel pipe having a nozzle opening into said cylinder; a fuel pump having an operating part the extent of movement of which controls the amount of fuel discharged from said nozzle; a lever connected to said part; means operated by the engine mechanism for operating said lever; and means connected to said lever and operative to shift the fulcrum thereof with relation to said part.

18. In a gas engine the combination with a cylinder; a piston therein; means for supplying air to said cylinder, a power shaft; and means for transmitting power from said piston to said shaft; of a fuel pipe having a nozzle opening into said cylinder; a fuel pump having an operating part, the extent of movement of which controls the amount of fuel discharged from said nozzle; a movable bracket; means for supporting and guiding said bracket; a lever connected to said part and having its fulcrum carried by said bracket; and means operated by the engine mechanism for operating said lever.

19. In a gas engine the combination with a cylinder; a piston therein; means for supplying air to said cylinder; a power shaft; and means for transmitting power from said piston to said shaft; of a fuel pipe having a nozzle opening into said cylinder; a fuel pump having an operating part, the extent of movement of which controls the amount of fuel discharged from said nozzle; a movable bracket; means for supporting and guiding said bracket; a lever connected to said part and having grooves in its sides; blocks slidably fitted to said grooves; fulcrum pins projecting from blocks and into said bracket; and means operated by the engine mechanism for operating said lever.

20. In a gas engine the combination with a cylinder; a piston therein; means for supplying air to said cylinder; a power shaft; and means for transmitting power from said piston to said shaft; of a fuel pipe having a nozzle opening into said cylinder; a fuel pump having an operating part the extent of movement of which controls the amount of fuel discharged from said nozzle; a lever having one end pivoted to said part; means for guiding the other end of said lever; means connected to said lever and operative to shift the fulcrum thereof with relation to said part; and means operated by the engine mechanism for operating said lever.

21. In a gas engine the combination with a cylinder; a piston therein; means for supplying air to said cylinder; a power shaft; and means for transmitting power from said piston and cylinder to said shaft; of a fuel pipe having a nozzle opening into said cylinder; a fuel pump having an operating part the extent of movement of which controls the amount of fuel discharged from said nozzle; a movable bracket; means for supporting and guiding said bracket; a lever having its fulcrum carried by said bracket and having one end pivoted to said part; means for guiding the other end of said lever; and means operated by the engine mechanism for operating said lever.

22. In a gas engine the combination with a cylinder; a piston therein; means for supplying air to said cylinder; a power shaft; and means for transmitting power from said piston and cylinder to said shaft; of a fuel pipe having a nozzle opening into said cylinder; a fuel pump having an operating part, the extent of movement of which controls the amount of fuel discharged from said nozzle; a movable bracket; means for supporting and guiding said bracket; a lever having grooves in its sides and one end pivoted to said part; means for guiding the other end of said lever; blocks slidably fitted to said grooves; fulcrum pins projecting from said blocks and into said bracket; and means operated by the engine mechanism for operating said lever.

23. In a gas engine the combination with a cylinder; a piston therein; means for supplying air to said cylinder; a power shaft; and means for transmitting power from said piston and cylinder to said shaft; of a fuel nozzle having a valve opening communicating with said cylinder; a spring pressed valve normally closing said opening; and means for forcing fuel through said opening against the spring action of said valve at predetermined intervals during the operation of the engine.

24. In a gas engine the combination with a cylinder; a piston therein; means for supplying air to said cylinder; a power shaft; and means for transmitting power from said piston and cylinder to said shaft; of a fuel nozzle having a valve opening communicating with said cylinder; a spring pressed valve normally closing said opening; means for forcing fuel through said opening against the spring action of said valve at predetermined intervals during the operation of the engine; and means operative to vary the quantity of fuel forced through said opening.

25. In a gas engine the combination with a cylinder; a piston therein; means for supplying air to said cylinder; a power shaft; and means for transmitting power from said piston and cylinder to said shaft; of a fuel nozzle having a valve opening communicating with said cylinder; a spring pressed valve normally closing said opening; a flange surrounding said opening and extending toward the interior of the cylinder and having an interior diameter greater than the diameter of said opening; and means for forcing fuel through said opening against the spring action of said valve at predetermined intervals during the operation of the engine.

26. In a gas engine the combination with a cylinder; a piston therein; means for supplying air to said cylinder; a power shaft; and means for transmitting power from said piston and cylinder to said shaft; of a fuel nozzle having a valve opening communicating with said cylinder; a spring pressed valve normally closing said opening; a flange surrounding said opening and extending toward the interior of the cylinder and having an interior diameter greater than the diameter of said opening; said flange also having a series of openings extending therethrough; and means for forcing fuel through said opening against the spring action of said valve at predetermined intervals during the operation of the engine.

27. In a gas engine, the combination of a fixed cylinder; a movable piston therein; a movable cylinder, a fixed piston therein, one cylinder forming the combustion cylinder and the other cylinder forming an air compression cylinder; a power shaft; means for transmitting power from said movable piston and said movable cylinder to said power shaft; said air compression cylinder having an inlet passageway and an outlet passageway leading to a position adjacent the combustion cylinder; a valve controlling said inlet passageway; and means for establishing communication between said outlet passageway and said high pressure cylinder at predetermined intervals.

28. In a gas engine, the combination of a fixed cylinder; a movable piston therein; a movable cylinder, a fixed piston therein, one cylinder forming the combustion cylinder and the other cylinder forming an air compression cylinder; a power shaft; means for transmitting power from said movable piston and said movable cylinder to said power shaft; said air compression cylinder having an inlet passageway and an outlet passageway leading to a position adjacent the combustion cylinder; a valve controlling said inlet passageway; a valve permitting air to pass through said outlet passageway toward the combustion cylinder and preventing air from passing in a reverse direction; and means for establishing communication between said outlet passageway and said high pressure cylinder at predetermined intervals.

In testimony whereof, I affix my signature in the presence of two witnesses.

GEORGE W. JESSUP, Jr.

Witnesses:
A. V. GROUPE,
WM. HARRISON SMITH.

---

Copies of this patent may be obtained for five cents each, by addressing the "Commissioner of Patents, Washington, D. C."